US006193025B1

(12) United States Patent
Nakagawa

(10) Patent No.: US 6,193,025 B1
(45) Date of Patent: Feb. 27, 2001

(54) DISK-BRAKE PAD

(75) Inventor: Mitsuhiko Nakagawa, Itami (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/192,598

(22) Filed: Nov. 17, 1998

(30) Foreign Application Priority Data

Nov. 20, 1997 (JP) .................................................. 9-337978

(51) Int. Cl.$^7$ ............................. F16D 65/38; F16D 69/00
(52) U.S. Cl. .................................. 188/73.37; 188/250 B; 188/251 A
(58) Field of Search ..................... 188/73.1, 73.36, 188/73.37, 218 XL, 251 A, 251 M, 250 E, 250 B

(56) References Cited

U.S. PATENT DOCUMENTS

| 4,373,615 | * | 2/1983 | Melinat ................................. 188/73.1 |
| 4,400,229 | * | 8/1983 | Demmer et al. .................. 156/307.5 |
| 4,792,361 | * | 12/1988 | Double et al. .................... 188/251 A |
| 4,920,159 | * | 4/1990 | Das et al. ............................. 523/153 |
| 4,944,373 | * | 7/1990 | Ohya et al. ........................ 188/251 A |
| 5,236,528 | * | 8/1993 | Nakagawa ............................ 188/73.1 |
| 5,266,395 | * | 11/1993 | Yamashita et al. .............. 188/251 A |
| 5,268,398 | * | 12/1993 | Nakagawa et al. ................... 523/158 |
| 5,407,034 | * | 4/1995 | Vydra et al. ....................... 188/73.37 |
| 5,411,773 | * | 5/1995 | Ohya et al. ........................ 188/251 A |
| 5,515,950 | * | 5/1996 | Kwolek .............................. 188/73.36 |
| 5,516,816 | * | 5/1996 | Samuels ................................ 523/149 |
| 5,767,022 | * | 6/1998 | Clere et al. ....................... 188/251 A |
| 6,041,893 | * | 3/2000 | Ervens et al. ..................... 188/73.37 |

FOREIGN PATENT DOCUMENTS

| 55-110845 | 1/1979 | (JP) . |
| 56-171440 | 5/1980 | (JP) . |
| 57-24334 | 7/1980 | (JP) . |

OTHER PUBLICATIONS

Automotive Handbook, published by Robert Bosch GmbH, pp. 216–217, Oct. 1996.*

* cited by examiner

Primary Examiner—Robert J. Oberleitner
Assistant Examiner—Thomas J. Williams
(74) Attorney, Agent, or Firm—Greenblum & Bernstein, P.L.C.

(57) ABSTRACT

A pad for disk brakes for controlling the revolution of revolving parts of vehicles and machines that has improved heat resistivity in an underlayer material interposed between a friction material and a backing plate to be used under heavy-load conditions in particular. The underlayer material includes linear or branched plastic having a melting temperature of 200° C. or higher at normal pressure. The underlayer material may comprise not only a single layer but also a plurality of layers having different composition to enhance the effectiveness.

19 Claims, No Drawings

DISK-BRAKE PAD

BACKGROUND OF THE INVENTION

1. Field of the Invention

The present invention relates to a pad used for disk brakes that control the revolution of revolving parts of vehicles and machines.

2. Description of Background Information

Disk-brake pads are used for friction members in disk brakes that control the speed of automobiles, railway vehicles, and machines. The friction member comprises a backing plate that contacts a piston and a friction material that rubs against a disk. An underlayer material is sometimes provided between the backing plate and the friction material when the load for the friction material is severe or when the improvement of the performance of the friction material is required.

The underlayer material has three major functions. The first is to prevent the heat generated by friction from conducting to the brake piston. The second is to prevent the deterioration of the bonding between the friction material and the backing plate when the performance of the friction material is improved at the cost of bonding strength. The third is to reduce noises generated by the vibration of the friction material.

Therefore, it is desirable that the material used for the underlayer material not only be suitable for a friction material but also have a heat insulation effect, a good bonding with the backing plate, and an ability to compensate the performance weakness of a standard friction material.

A friction material particularly for heavy loads, known as a semimetallic pad, includes a substantial amount of steel fiber or steel particles. Because this pad has high thermal conductivity owing to its constituents and conducts the heat generated by friction to the backing plate readily, it is common to employ an underlayer material as a thermal insulator to prevent the heat conduction when this semimetallic pad is used.

In this case, the heat generated at the friction surface diffuses to both the disk and pad. When the pad has high thermal conductivity, it undesirably absorbs the heat. When the pad has low thermal conductivity, most of the heat is conducted to the disk and dissipated by the revolution of the disk. In other words, an underlayer material reduces the thermal conductivity of the pad and directs the generated heat to the revolving disk to be dissipated there.

An underlayer material should also have a strong bonding with the backing plate. In order to maintain the strong bonding in withstanding repetitive temperature variations, the underlayer material should have a composition similar to that of the friction material and thus have good compatibility with the friction material.

An underlayer material principally consists of fibrous materials, binders, and powder and/or granular fillers. Particularly, when a semimetallic material is used as the friction material, it is desirable that steel fiber be used as the fibrous material because the same has good compatibility with the friction material.

As the constituents thereof, some underlayer materials have the same phenolic resin-based binder as the friction material has and include a material having a cushion effect such as cashew dust or rubber powders to absorb vibration caused by friction. Because these organic substances have low thermal conductivity, small specific gravity, and small specific heat, they reduce the thermal conductivity of the underlayer material. A fibrous material is used to resist the shearing force generated between the disk rubbing surface and the backing plate when frictional force is applied. Inorganic fillers are used to reinforce heat-resisting properties.

As mentioned above, an underlayer material has various purposes, and to fulfill these purposes suitable materials are incorporated. However, under heavy load conditions, particularly when a car descends a long downhill with increased frequency of brake application, for instance, if the heat dissipation is insufficient from the brake, the heat generated by friction will accumulate in the disk and pad, raising the temperature thereof considerably. If this condition continues for a prolonged period of time or recurs many times, the organic materials used in the underlayer material will deteriorate and even carbonize in an extreme case, resulting in increased thermal conductivity and loss of the vibration absorption effect thereof.

SUMMARY OF THE INVENTION

The principal object of the present invention is to improve the heat-resisting property of an underlayer material and offer a reliable pad applicable to heavy-duty disk brakes.

The feature of the invention is that the underlayer material includes powders or granules of linear or branched plastic having a melting temperature of 200° C. or higher at normal pressure.

The heat-resisting property of the linear or branched plastic used affects the thermal decomposition property thereof. It is desirable that the heating loss thereof be 50% or less when measured by a thermobalance at 450° C. on a specimen 10 to 15 mg in weight when the temperature is raised by a rate of 10° C./min in the atmosphere. On the other hand, three-dimensionally cross-linked polymers lack sufficient elasticity to exert a cushion effect, although they have a superior heat-resisting property.

It is desirable that such linear or branched plastic be at least one kind of plastic selected from the group consisting of polyallylenesulfone, polyallylenesulfide, a liquid crystal polymer (LCP), and amorphous polyallylate or be a polymer alloy including any of these polymers. These plastic materials are used not only to utilize the heat of fusion when they melt but also to prevent gas generation due to decomposition thereof and of other materials. To exploit the advantages of the plastic, it is desirable that the underlayer material include steel fiber and at least one kind of fiber selected from the group consisting of copper or copper alloy fiber, organic fiber, and inorganic fiber. It is preferable that the underlayer material in the brake pad of the invention be used in combination with a friction material containing steel fiber to maximize the performance of the pad.

Yet, it is especially effective for heavy-duty application that a plurality of layers of underlayer material is provided and the layer close to the friction material and the layer close to the backing plate have different compositions so that the cushion effect thereof is increased.

It is usual practice to improve the heat-resisting property of constituent plastic in order to improve the property of the underlayer material as a whole. The adoption of linear or branched plastic as the constituent plastic is a feature of the invention. Linear or branched plastic has a discernible melting point as is seen in polyethylene, polyvinyl chloride, and nylon and will melt before decomposing, absorbing heat of fusion from the environment. The melting causes the plastic to adhere closely to the neighboring fiber and fillers, forming a stronger matrix. It is desirable that linear or branched plastic be selected from a superengineering plastic group or superheat-resistive plastics, with amorphous plastics being accepted.

As for the plastic to be included in the underlayer material, pulverized plastic is desirable, because it is easily dispersed at the time of blending. Granular plastic is also dispersible by means of mixing. Proper selection of a mixing means even allows the use of fibrous or pelletized plastic.

The group of linear plastics having a melting point of 200° C. or higher at normal pressure is called engineering plastics, which includes a nylon group (nylon 6 and nylon 66), polyvinyl chloride (PVC), polyethylene terephthalate (PET) and polybutylene terephthalate (PBT) both belonging to a polyester group, and polytetrafluoroethylene (PTFE) and polychlorotrifluoroethylene (PCTF) both belonging to a fluorocarbon group. There also is another kind of plastic called superengineering plastics, which includes polyphenylenesulfide (PPS), polysulfone (PSF), polyethersulfone (PES), polyetherimide (PEI), polyetheretherketone (PEEK), and aromatic polyester (brand names of Unitika Ltd.: U-POLYMER and ECONOL). Superheat-resistive aromatic polyimide and polyamideimide are also available. In addition, it is also possible to use a polymer alloy that is a mixture of different kinds of plastics. The alloying generally decreases a softening temperature that exists below a melting point, enabling effective use of vibration-repressing power. Known as a cross-linked type, PPS partially reacts by making branches when oxidized at an elevated temperature, exhibiting higher heat-resistivity for the use of the invention than expected from the melting point thereof, making this material one of the desirable kinds of plastics.

Among these plastic materials, those that do not include halogenous elements, such as F, Cl, Br, or I, are desirable because they do not cause environmental problems due to their thermal decomposition or by the heat treatment of used pads. In addition, in terms of heat resistivity, it is desirable that at least one kind of plastic selected from the superengineering plastics be used including polyallylenesulfone (polysulfone, polyethersulfone, polyallylsulfone, polyimidesulfone, etc.), polyallylene sulfide (polyphenylenesulfide, polyphenylenesulfideketone, etc.), liquid crystal polymers (brand name of Hoechst Celanese Co.: VECTRA, for example), and amorphous polyallylate or a polymer alloy including any of these substances. It is desirable that these plastic materials have good compatibility with the phenolic resin or the metamerism thereof used as the binder in the underlayer material, because this enables the fixation of powders or granules at the time of forming.

Said plastic materials are suitably reduced to powder by mechanical frozen pulverization. The plastic may be dissolved in a solvent to be atomized in a dispersant. The powders and granules should have a size in such a range as to mix uniformly when blended, desirably between several microns and about 2 mm, and preferably between 0.1 and 0.5 mm.

The underlayer material should have such composition as to fully utilize the advantages of said plastic powders or granules. It is especially effective when the constituents include steel fiber and at least one kind of fiber selected from the group consisting of copper or copper alloy fiber, organic fiber, and inorganic fiber. The fiber is the framework of the materials and has a role of withstanding strong shearing forces. The combination of two or more kinds of fiber desirably produces a tight framework, so that even when the plastic melts, the fiber will be able to hold the molten plastic.

It is desirable that the plastic account for 0.5 to 10-wt % in a completed underlayer material. If less than 0.5 wt %, the vibration-suppressing effect of the underlayer material is insufficient; if more than 10-wt %, the increased amount of organic substances in the underlayer material decreases the resistivity against thermal deterioration. When a plurality of layers of underlayer material is used, the allowable amount of plastic extends to 0.5 to 20 wt % on condition that the layer contacts to the friction material has the same limits as the above-mentioned single-layer underlayer material.

Especially for heavy-duty application, it is possible to increase the cushion effect for heat and vibration by constituting a plurality of layers of underlayer material that comprises a layer "A" adjacent to the friction material, a layer "B" adjacent to the backing plate, and even an intermediate layer "C" if required. In this constitution, the composition of the layers of the underlayer material is graded in such a way that the constituents that have the necessary properties as underlayer material are gradually added to the constituents for friction material from the layer adjacent to the friction material to the layer adjacent to the backing plate in order to decrease the difference in the material at the interface between the friction material and the underlayer material. In particular, when used under a heavy load, a mechanical stress will be concentrated to the detriment of the interface due to the temperature difference and heat distortion caused by disaccord in thermal expansion and thermal conductivity. The grading of composition in a plurality of layers of underlayer material will mitigate the temperature difference and the concentration of heat distortion at each individual interface.

The above-mentioned features of the invention produce a disk pad that generates reduced noise particularly at elevated temperatures, has durability under prolonged deteriorating conditions at high temperatures, and thus is most suitable for heavy-duty use.

DESCRIPTION OF THE PREFERRED EMBODIMENT

The following is the preferred embodiment of the invention; these examples are not to limit the application range of the invention.

EXAMPLES 1 to 6

Disk-brake pads for a 4-ton truck were prepared. The pads have friction areas of 90 cm$^2$ at the front and 112 cm$^2$ at the rear, a backing plate thickness of 8 mm, and a pad thickness of 14 mm. Semimetallic materials shown in Table 1 were used for the friction material. The materials used for the underlayer material are listed in Table 2.

TABLE 1

| Composition of the Friction Material (Unit: wt %) | |
|---|---|
| Steel fiber | 64.5 |
| Graphite | 18 |
| Phenolic resin | 10 |
| Barium sulfate | 4 |
| NBR powders | 1 |
| MgO powders | 2 |
| ZrO$_2$ powders | 0.5 |

TABLE 2

Composition of the Underlayer Material (Unit: wt %)

| Example No. | | 1 | 2 | 3 | 4 | 5 | 6 |
|---|---|---|---|---|---|---|---|
| Steel fiber | | 45 | 45 | 45 | 45 | 45 | 45 |
| Aramid fiber | | 7 | 7 | 7 | 7 | 7 | 7 |
| Slag wool | | 20 | 16 | 18 | 18 | 18 | 18 |
| Barium sulfate | | 9 | 9 | 9 | 9 | 9 | 9 |
| Phenolic resin | | 9 | 9 | 9 | 9 | 9 | 9 |
| Calcium hydroxide | | 2 | 2 | 2 | 2 | 2 | 2 |
| $Sb_2O_3$ powders | | 4 | 4 | 4 | 4 | 4 | 4 |
| PPS powders | *1 | 4 | 8 | — | — | — | — |
| U-8060 | *2 | — | — | 6 | — | — | — |
| 4100G | *3 | — | — | — | 6 | — | — |
| E5008 | *4 | — | — | — | — | 6 | — |
| AMORVON | *5 | — | — | — | — | — | 6 |

*1: Tosoh Corp. make : No. 160
*2: Unitika Ltd. make: Polyallylate/PET alloy
*3: Sumitomo Chemical Co. make: PES (polyethersulfone)
*4: Sumitomo Chemical Co. make: LCP (liquid crystal polymer)
*5: Dainippon Ink and Chemicals Inc. make: PPS/polyphenylenesulfidesulfone copolymer The constituent materials were evenly mixed by an Eilich mixer. The weight of the mixtures was measured to form two solid layers, one for the friction material and the other for the underlayer material, using a preliminary molder. The backing plate was washed to remove oily substances and applied with a phenolic resin-based bonding agent and dried.

The formed materials and the backing plate were then molded under pressure while heated with a hot mold at 160° C. using a hot molder. An after-cure was conducted at 230° C. for 4 hours, a paint was applied, and then the friction material was ground until it reached a predetermined thickness. The thickness of the underlayer material of the completed samples was almost the same as the designed thickness of 3 mm.

Comparative examples were provided with a conventional composition for the underlayer material as shown in Table 3 and the same composition for the friction material as that shown in Table 1 used for examples 1 to 6. The pads for comparative examples were produced by the same method as described above.

TABLE 3

Composition of a Conventional Underlayer Material (Unit: wt %)

| Comparative example No. | 1 | 2 |
|---|---|---|
| Steel fiber | 45 | — |
| Aramid fiber | 7 | — |
| Slag wool | 20 | 50 |
| Barium sulfate | 9 | 25 |
| Phenolic resin | 9 | 10 |
| Calcium hydroxide | 2 | 2 |
| $Sb_2O_3$ powder | 4 | 4 |
| Cashew dust | 4 | — |
| Graphite | — | 5 |
| Rubber powders | — | 4 |

EXAMPLES 7 and 8

Pads having two layers of underlayer material were produced by a similar process to that of examples 1 to 6. The same composition as shown in Table 1 used in examples 1 to 6 was applied to the friction material, and two kinds of composition were provided for the underlayer materials as shown in Tables 4 and 5. The weight of the material of the underlayer materials was measured so that each layer had the same thickness of 1.5 mm when completed. The underlayer material "B" was first placed in the mold of a preliminary molder, followed by the underlayer material "A" and the friction material in this sequence to be molded under pressure while heated.

TABLE 4

Composition of the Underlayer Material "A" (Unit: wt %)

| Comparative example No. | 7 | 8 |
|---|---|---|
| Steel fiber | 65 | 65 |
| Aramid fiber | — | 4 |
| Slag wool | 13 | 4 |
| Barium sulfate | 8 | 8 |
| Phenolic resin | 6 | 7 |
| Calcium hydroxide | 2 | 2 |
| $Sb_2O_3$ powders | 4 | 4 |
| PPS powders | 2 | 1 |
| Graphite | — | 5 |

TABLE 5

Composition of the Underlayer Material "B" (Unit: wt %)

| Comparative example No. | 7 | 8 |
|---|---|---|
| Steel fiber | 49 | 45 |
| Aramid fiber | 9 | 7 |
| Slag wool | 20 | 20 |
| Barium sulfate | 2 | 3 |
| Phenolic resin | 8 | 7 |
| Calcium hydroxide | 2 | 2 |
| $Sb_2O_3$ powders | 2 | 4 |
| PPS powders | 8 | — |
| AMORVON | — | 12 |

Running Test

The pad was attached to a 4-ton truck to carry out a running test with capacity loads. The test conditions were as follows:

Braking conditions: Running at a speed of 50 km/h the truck was braked to a stop, and then accelerated immediately. This was repeated 50 times at 20-second intervals as one cycle. This cycle was repeated 120 times.

Braking temperature: Starting at normal temperature, the disk temperature was controlled to be 495 to 505° C. immediately after the 50th application of braking by adjusting the cooling air.

Increase in disk temperature by brake application during the running operation was confirmed in advance by repeated tests using the same samples, and the cooling air was adjusted beforehand.

The disk pad was detached from the truck after the running operation to visually examine the interfaces between the backing plate and underlayer material and between the underlayer material and friction material. The results are shown in Table 6. Comparative example 1 having a conventional underlayer material had cracks over most of the periphery of the pad at the interface between the underlayer material and friction material. The sample also had a crack into which a thickness gauge 0.2 mm thick could penetrate more than 5 mm at the interface between the backing plate and underlayer material. Comparative example 2 formed cracks extensively at the interface between the underlayer material and friction material to the degree that the test was terminated at the 80th cycle because the sample was judged to be incapable of completing the 120-cycle test. Whereas many samples for examples 1 to 6 had visible cracks at the bonded interface between the backing plate and underlayer material and at the interface between the underlayer material and friction material, cracks in the samples for examples 7 and 8 were scarce. There was considerable variation in the test results because severe conditions similar to the critical conditions in actual use were employed. The results clearly show that the samples provided in accordance with the invention have sufficient durability under cyclic heat conditions as opposed to the samples made by a conventional design concept.

TABLE 6

Results of the Running Test

Rate of crack formation after the 120th cycle(%)*1

| Example No. | Bonded interface between the backing plate and underlayer material | Interface between the underlayer material and friction material |
|---|---|---|
| 1 | 0~10 | 0~20 |
| 2 | 0 | 10~25 |
| 3 | 0~10 | 20~35 |
| 4 | 0~10 | 15~30 |
| 5 | 0~10 | 5~15 |
| 6 | 0~5 | 0~15 |
| 7 | 0 | 0 |
| 8 | 0 | 0~5 |
| Comparative example No. | | |
| 1 | 30~50 | 700~100 |
| 2 | 0 | 100*2 |

*1: The total of the peripheral lengths where cracks were found is divided by the entire peripheral length of the disk pad.
*2: The test was terminated at the 80th cycle.

Noise Test

Noise tests were carried out with the same truck and under the same conditions using new disk pads and disks. The test conditions were as follows:

Timing of the test: The following tests were carried out immediately following the third and 15th cycle of the above-mentioned running test.

Vehicle conditions: A 4-ton truck with capacity loads was used.

Braking conditions: Running at a speed of 30 km/h braking was applied to a stop. Applied deceleration was 0.05 g, 0.1 g, 0.15 g, 0.2 g, 0.25 g, 0.3 g, 0.35 g, and 0.4 g, where "g" means the acceleration of gravity, 9.8 m/sec$^2$. One application each of the deceleration was tested.

Temperature before applying brakes: The tests were conducted at 50, 100, 150, 200, and 250° C. One application each of the braking above was tested.

The results of the tests conducted on examples 1, 3, 5, 7, and 8 and comparative example 1 are summarized in Table 7. Each example has a lower rate of noise generation than the comparative example under various conditions, the difference being greater particularly at the elevated temperatures. The result shows the notable effectiveness of the present invention.

TABLE 7

Results of Noise Test

| Example No. | Rate of noise generation (%) | Number of times of noise generation at 200 and 250° C. in disk temperature |
|---|---|---|
| 1 | 10 | No noise generated |
| 3 | 8 | 5 |
| 5 | 6 | 2 |
| 7 | 7 | No noise generated |
| 8 | 12 | 1 |
| Comparative example No. | | |
| 1 | 80 | Great-volume noises generated |

What is claimed is:

1. A disk-brake pad which comprises: a metal backing plate, a disk-rubbing friction material, and an underlayer material interposed between the backing plate and the friction material, wherein the underlayer material comprises powders or granules of linear plastic or branched plastic, each having a melting temperature of 200° C. or higher at normal pressure;
   the powders or the granules of the linear plastic or the branched plastic having a heating decomposition loss of 50% or less when tested at 450° C.

2. The disk-brake pad as defined in claim 1, wherein the powders or the granules of the linear plastic or the branched plastic is at least one kind of plastic selected from the group consisting of polyallylenesulfone, polyallylenesulfide, a liquid-crystal polymer, amorphous polyallylate, and a polymer alloy including any of the materials thereof.

3. The disk-brake pad as defined in claim 1, wherein the friction material includes steel fiber in the composition thereof.

4. The disk-brake pad as defined in claim 1, wherein the underlayer material includes in the composition thereof steel fiber and at least one kind of fiber selected from the group consisting of copper fiber, copper alloy fiber, organic fiber, and inorganic fiber.

5. The disk-brake pad as defined in claim 1, 2, 3, or 4, wherein the underlayer material comprises a plurality of layers with different composition.

6. The disk-brake pad as defined in claim 1 wherein said underlayer material comprises pulverized plastic particles having a size between 0.1 mm to about 2 mm.

7. The disk-brake pad as defined in claim 6 wherein said pulverized plastic particles have a size between 0.1 mm to 0.5 mm.

8. The disk-brake pad as defined in claim 1 wherein said linear plastic or branched plastic is an engineering plastic.

9. The disk-brake pad as defined in claim 8 wherein said engineering plastic is at least one of nylon 6, nylon 66, polyvinyl chloride, polyethylene terephthalate, polybutylene terephthalate, polytetrafluoroethylene, and polychlorotrifluroethylene.

10. The disk-brake pad as defined in claim 1 wherein said linear plastic or branched plastic is a superengineering plastic.

11. The disk-brake pad as defined in claim 10 wherein said superengineering plastic is at least one of polyphenylenesulfide, polysulfone, polyethersulfone, polyetherimide, polyetheretherketone, and aromatic polyester.

12. The disk-brake pad as defined in claim 1 wherein said underlayer material further comprises one or more phenolic resins or the metamerism thereof.

13. The disk-brake pad as defined in claim 1 wherein said plastic constitutes 0.5 to 10 wt. % of said underlayer material.

14. The disk-brake pad as defined in claim 4 wherein said underlayer material further comprises at least one filler.

15. The disk-brake pad as defined in claim 5 wherein said plurality of layers comprise a layer "A" adjacent to the friction material and a layer "B" adjacent to the backing plate.

16. The disk-brake pad as defined in claim 15 wherein said plurality of layers further comprises a layer "C" interposed between layer "A" and layer "B".

17. The disk-brake pad as defined in claim 15 wherein said plastic constitutes 0.5 to 10 wt. % of said layer "A" and said plastic constitutes 0.5 to 20 wt. % of said layer "B".

18. The disk-brake pad as defined in claim 16 wherein said plastic constitutes 0.5 to 10 wt. % of said layer "A", said plastic constitutes 0.5 to 20 wt. % of said layer "B", and said plastic constitutes 0.5 to 20 wt. % of said layer "C".

19. A disk-brake pad which comprises (1) a metal backing plate, (2) a disk-rubbing friction material, and (3) an underlayer material interposed between the backing plate and the friction material, wherein said underlayer material comprises powders or granules of linear plastic or branched plastic, each having a melting temperature of 200° C. or higher at normal pressure and having a heat decomposition loss of 50% or less when tested at 450° C.;

wherein said plastic has a size between 0.1 mm to 0.5 mm;

wherein said plastic is at least one of an engineering plastic or a superengineering plastic;

wherein said underlayer material further comprises one or more phenolic resins or the metamerism thereof and at least one filler;

wherein said underlayer material has at least two layers with layer "A" adjacent to the friction material and layer "B" adjacent to the backing plate;

wherein said layer "A" has 0.5 to 10 wt. % of said plastics; and wherein said layer "B" has 0.5 to 20 wt. % of said plastics.

* * * * *

UNITED STATES PATENT AND TRADEMARK OFFICE
CERTIFICATE OF CORRECTION

PATENT NO.   : 6,193,025 B1
DATED        : February 27, 2001
INVENTOR(S)  : M. Nakagawa It is certified that error appears in the above-identified patent and that said Letters Patent is hereby corrected as shown below:

<u>Column 8,</u>
Line 44, "claim 1, 2, 3, or 4" should be -- claim 1 --.

Signed and Sealed this

Twenty-eighth Day of May, 2002

Attest:

JAMES E. ROGAN
*Attesting Officer*   *Director of the United States Patent and Trademark Office*